US010773474B2

(12) United States Patent
Zhang et al.

(10) Patent No.: US 10,773,474 B2
(45) Date of Patent: Sep. 15, 2020

(54) SYSTEM FOR PRODUCING A FULLY IMPREGNATED THERMOPLASTIC PREPREG

(71) Applicant: JOHNS MANVILLE, Denver, CO (US)

(72) Inventors: Mingfu Zhang, Highlands Ranch, CO (US); Klaus Friedrich Gleich, Nuremberg (DE); Asheber Yohannes, Littleton, CO (US); Michael John Block, Centennial, CO (US); Jawed Asrar, Englewood, CO (US); Derek Cooper Bristol, Littleton, CO (US); Christopher P Sandoval, Littleton, CO (US)

(73) Assignee: Johns Manville, Denver, CO (US)

( * ) Notice: Subject to any disclaimer, the term of this patent is extended or adjusted under 35 U.S.C. 154(b) by 50 days.

(21) Appl. No.: 16/032,291

(22) Filed: Jul. 11, 2018

(65) Prior Publication Data
US 2018/0319105 A1 Nov. 8, 2018

Related U.S. Application Data

(62) Division of application No. 14/845,007, filed on Sep. 3, 2015, now Pat. No. 10,105,871.

(51) Int. Cl.
| | |
|---|---|
| *C08K 7/00* | (2006.01) |
| *B29C 70/50* | (2006.01) |
| *D06M 15/51* | (2006.01) |
| *D06M 15/61* | (2006.01) |
| *D06M 15/71* | (2006.01) |
| *C08K 7/14* | (2006.01) |
| *C08J 3/24* | (2006.01) |
| *C08J 5/24* | (2006.01) |
| *C08L 77/02* | (2006.01) |
| *B05C 9/10* | (2006.01) |
| *B05C 9/12* | (2006.01) |
| *B05C 9/14* | (2006.01) |
| *B05C 11/02* | (2006.01) |
| *B05D 1/40* | (2006.01) |
| *B05D 3/02* | (2006.01) |
| *B29B 13/02* | (2006.01) |
| *B29B 13/06* | (2006.01) |
| *B29B 15/12* | (2006.01) |
| *B29B 15/14* | (2006.01) |
| *B29C 70/06* | (2006.01) |
| *B29B 11/12* | (2006.01) |
| *B29B 11/16* | (2006.01) |
| *D06M 15/705* | (2006.01) |

(Continued)

(52) U.S. Cl.
CPC ............... *B29C 70/50* (2013.01); *B05C 9/10* (2013.01); *B05C 9/12* (2013.01); *B05C 9/14* (2013.01); *B05C 11/021* (2013.01); *B05D 1/40* (2013.01); *B05D 3/0227* (2013.01); *B05D 3/0272* (2013.01); *B29B 11/12* (2013.01); *B29B 11/16* (2013.01); *B29B 13/02* (2013.01); *B29B 13/06* (2013.01); *B29B 15/122* (2013.01); *B29B 15/14* (2013.01); *B29C 70/06* (2013.01); *C08J 3/242* (2013.01); *C08J 3/247* (2013.01); *C08J 5/24* (2013.01); *C08K 7/14* (2013.01); *C08L 77/02* (2013.01); *D06M 15/51* (2013.01); *D06M 15/61* (2013.01); *D06M 15/71* (2013.01); *B29K 2033/12* (2013.01); *B29K 2105/089* (2013.01); *B29K 2105/0872* (2013.01); *B29K 2105/256* (2013.01); *B29L 2007/002* (2013.01); *B29L 2009/00* (2013.01); *D06M 15/705* (2013.01); *Y10T 442/2992* (2015.04)

(58) Field of Classification Search
CPC .. B29C 70/50; B05C 9/10; B05C 9/12; B05C 9/14; B05C 11/021; B05C 3/0227; B05C 3/0272; C08J 3/242; C08J 3/247; C08J 5/24; C08K 7/14; C08L 77/02; D06M 15/51; D06M 15/61; D06M 15/71
USPC ........................................................ 523/222
See application file for complete search history.

(56) References Cited

U.S. PATENT DOCUMENTS

| | | |
|---|---|---|
| 3,347,818 A | 10/1967 | Lau et al. |
| 4,495,017 A | 1/1985 | Abe et al. |

(Continued)

FOREIGN PATENT DOCUMENTS

| | | |
|---|---|---|
| CN | 103 570 961 A | 2/2014 |
| DE | 22 49 189 A1 | 4/1974 |

(Continued)

OTHER PUBLICATIONS

US 10,449,735 B2, 10/2019, Zhang (withdrawn)*

Primary Examiner — Hannah J Pak
(74) Attorney, Agent, or Firm — Robert D. Touslee

(57) ABSTRACT

According to one embodiment, a system for manufacturing a polymethyl methacrylate (PMMA) prepreg includes a mechanism for continuously moving a fabric or mat and a resin application component that applies a methyl methacrylate (MMA) resin to the fabric or mat. The system also includes a press mechanism that presses the fabric or mat during the continuous movement subsequent to the application of the MMA resin to ensure that the MMA resin fully saturates the fabric or mat. The system further includes a curing oven through which the fabric or mat is continuously moved. The curing oven is maintained at a temperature of between 40° C. and 100° C. to polymerize the MMA resin and thereby form PMMA so that upon exiting the curing oven, the fabric or mat is fully impregnated with PMMA.

18 Claims, 3 Drawing Sheets

(51) Int. Cl.
*B29K 105/08* (2006.01)
*B29K 105/00* (2006.01)
*B29L 7/00* (2006.01)
*B29L 9/00* (2006.01)
*B29K 33/00* (2006.01)

(56) References Cited

U.S. PATENT DOCUMENTS

| | | |
|---|---|---|
| 5,374,385 A | 12/1994 | Biase et al. |
| 5,424,388 A | 6/1995 | Chen et al. |
| 5,679,719 A | 10/1997 | Klemarczyk et al. |
| 5,780,099 A | 7/1998 | Gilligan et al. |
| 5,837,181 A | 11/1998 | Leimbacher et al. |
| 8,123,887 B2 | 2/2012 | Green |
| 9,815,954 B2 * | 11/2017 | Zhang ................ C08J 5/24 |
| 9,962,888 B2 | 5/2018 | Zhang et al. |
| 9,993,945 B2 | 6/2018 | Zhang et al. |
| 10,105,871 B2 * | 10/2018 | Zhang ................ B29C 70/50 |
| 10,569,483 B2 * | 2/2020 | Zhang ................ B05C 9/14 |
| 2005/0214465 A1 | 9/2005 | Maskus et al. |
| 2008/0078150 A1 | 4/2008 | Kariya |
| 2009/0233508 A1 * | 9/2009 | Kubota ................ C08J 5/24 442/287 |
| 2012/0107509 A1 | 5/2012 | Scherzer et al. |
| 2013/0165585 A1 | 6/2013 | Tadepalli et al. |
| 2013/0221555 A1 | 8/2013 | Radtke et al. |
| 2013/0295806 A1 | 11/2013 | Imai et al. |
| 2015/0145175 A1 | 5/2015 | Zhang et al. |
| 2017/0066158 A1 | 3/2017 | Zhang et al. |
| 2018/0030228 A1 * | 2/2018 | Zhang ................ C08J 5/24 |
| 2018/0229399 A1 | 8/2018 | Zhang et al. |
| 2019/0263078 A1 * | 8/2019 | Zhang ................ B05C 9/10 |

FOREIGN PATENT DOCUMENTS

| | | |
|---|---|---|
| DE | 10 2011 055 263 A1 | 5/2013 |
| JP | S60226510 A | 11/1985 |
| WO | 2013056845 A2 | 4/2013 |

* cited by examiner

… (US 10,773,474 B2)

SYSTEM FOR PRODUCING A FULLY IMPREGNATED THERMOPLASTIC PREPREG

CROSS-REFERENCE TO RELATED APPLICATIONS

This application is a division of pending U.S. patent application Ser. No. 14/845,007 filed Sep. 3, 2015, and titled "SYSTEM FOR PRODUCING A FULLY IMPREGNATED THERMOPLASTIC PREPREG", which is related to U.S. patent application Ser. No. 14/088,034 filed Nov. 22, 2013, and titled "FIBER-CONTAINING PREPREGS AND METHODS AND SYSTEMS OF MAKING," and to U.S. patent application Ser. No. 14/794,634 filed Jul. 8, 2015, and titled "SYSTEM FOR PRODUCING A FULLY IMPREGNATED THERMOPLASTIC PREPREG," now U.S. Pat. No. 9,993,945 issued Jun. 12, 2018, the entire disclosures of which are hereby incorporated by reference, for all purposes, as if fully set forth herein.

BACKGROUND

The use of fiber-reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Within the field of fiber-reinforced polymeric composites, thermoplastics are increasingly being used in place of thermosets as the matrix resin due to better durability, recyclability, thermoformability, improved throughput, lower material cost, and lower manufacturing cost.

Many continuous fiber reinforced thermoplastic composites are produced from impregnated tapes. These impregnated tapes may be unidirectional fiber tapes that are impregnated with a thermoplastic resin. These can be layered and thermoformed to produce a wide variety of composites of the desired shape and strength. There are significant challenges associated with producing impregnated tapes at low cost and high quality. Traditionally thermoplastic resins are melted and applied to fibers, but molten thermoplastic resins have very high viscosity and, when combined with the high fiber content that is desired, results in incomplete resin impregnation and/or low throughput. What is desired is a continuous manufacturing process with high throughput that produces fully impregnated thermoplastic prepregs without defects and good coupling between the fibers and the matrix resin. For the conventional partially impregnated thermoplastic prepregs, high pressure is needed in the consolidation step to promote additional impregnation, which introduces excessive flow of the resin matrix and causes detrimental changes in fiber orientation in the finished parts. The fully impregnated thermoplastic prepregs of the instant invention are advantageous in achieving the desired properties in final composite parts, as no additional impregnation is needed in the consolidation step.

BRIEF SUMMARY

The embodiments described herein provide fully impregnated thermoplastic prepreg products, and specifically systems and methods for making the same. According to one aspect, a system for manufacturing a fully impregnated polymethyl methacrylate prepreg in a continuous process includes a mechanism for moving a fabric or mat from a starting point to an ending point where the fabric or mat is subjected to a plurality of processes. The fabric or mat is in substantially constant movement between the starting point and ending point. The system also includes a resin application mechanism that is configured to apply a methyl methacrylate (MMA) resin to the fabric or mat as the fabric or mat is moved past the resin application mechanism. The MMA resin is in contact with an initiator upon application of the MMA resin to the fabric or mat. The initiator facilitates in polymerizing the MMA resin to form polymethyl methacrylate (PMMA). The system further includes a press mechanism that is configured to press the MMA resin through the fabric or mat as the fabric or mat is moved past or through the press mechanism such that the MMA resin fully saturates the fabric or mat during polymerization of the MMA resin. The system additionally includes a curing oven having a temperature of between 40 degrees Celsius and 100 degrees Celsius, and more commonly between 60 degrees Celsius and 80 degrees Celsius. The curing oven is configured to effect polymerization of the MMA resin to form PMMA as the fabric or mat is moved through the curing oven such that the fabric or mat is fully impregnated with a thermoplastic PMMA polymer upon exiting the curing oven. The system is configured to maintain the MMA resin at a temperature of between 40° C. and 80° C. prior to the application of the MMA resin to the fabric or mat.

According to another aspect, a system for manufacturing a polymethyl methacrylate prepreg includes a mechanism for continuously moving a fabric or mat and a resin application component that applies a methyl methacrylate (MMA) resin to the fabric or mat as the fabric or mat is continuously moved past the resin application component. The system also includes a press mechanism that presses the fabric or mat during the continuous movement of the fabric or mat and subsequent to application of the MMA resin to ensure that the MMA resin fully saturates the fabric or mat. The system further includes a curing oven through which the fabric or mat is continuously moved. The curing oven is maintained at a temperature of between 40° C. and 100° C., and more commonly between 60° C. and 80° C., to polymerize the MMA resin and thereby form a thermoplastic polymethyl methacrylate (PMMA) polymer so that upon exiting the curing oven, the fabric or mat is fully impregnated with the thermoplastic PMMA polymer.

According to another embodiment, a method of forming a fully impregnated polymethyl methacrylate prepreg includes moving a fabric or mat from a starting point to an ending point. The fabric or mat is subjected to a plurality of processes during movement of the fabric or mat between the starting point and ending point. The fabric or mat is also in substantially constant movement between the starting point and ending point. The method also includes mixing methyl methacrylate (MMA) resin with an initiator to form an MMA resin mixture. The initiator facilitates in polymerizing the MMA resin to form polymethyl methacrylate (PMMA). The method further includes applying the MMA resin mixture to the fabric or mat. The method additionally includes passing the MMA resin mixture coated fabric or mat through a calendar or press to press the MMA resin mixture entirely through the fabric or mat such that the MMA resin mixture fully saturates the fabric or mat. The method additionally includes passing the MMA resin mixture coated fabric or mat through a curing oven having a temperature that is maintained at between 40° C. and 100° C., and more commonly between 60° C. and 80° C., to polymerize the MMA resin and thereby form PMMA. Upon exiting the curing oven, the fabric or mat is fully impregnated with PMMA. Greater than 95%, 98%, or even 99% of the MMA resin may be polymerized to form PMMA.

According to another aspect, a method of forming a fully impregnated polymethyl methacrylate prepreg product includes applying a methyl methacrylate (MMA) resin to a fabric or mat. The MMA resin is combined with an initiator that facilitates in polymerizing the MMA resin to form polymethyl methacrylate (PMMA). The method also includes passing the MMA resin coated fabric or mat through a calendar or press to fully saturate the fabric or mat with the MMA resin. The method further includes passing the MMA resin saturated fabric or mat through a curing oven to polymerize the MMA resin throughout the fabric or mat and thereby form the fully impregnated PMMA prepreg. The fabric or mat is constantly moved during the above process and the above process occurs in a time of less than 10 minutes.

BRIEF DESCRIPTION OF THE DRAWINGS

The present technology is described in conjunction with the appended figures.

Figure 1:
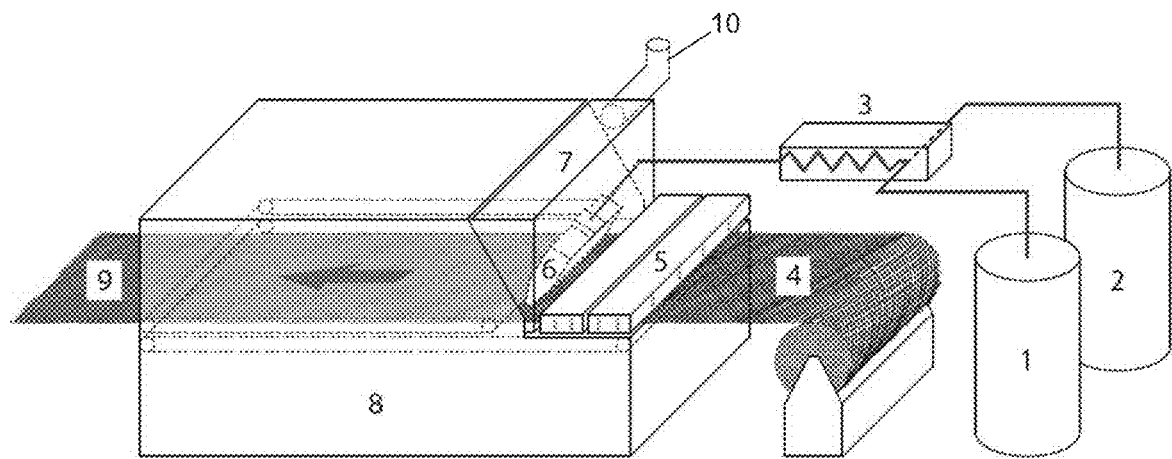
FIGS. 1 and 2 illustrate systems that may be used to produce prepregs that are fully impregnated with a thermoplastic polymer.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to fully impregnated thermoplastic prepreg products, and specifically systems and methods for making the same. The prepreg products are fully impregnated with thermoplastic materials that allow the prepreg products to be reheated and molded into a given shape. The prepreg products are made using reactive resin materials, specifically monomers and oligomers. Various reactive resins that may be utilized to form the fully impregnated thermoplastic prepreg products are described below.

In order to achieve a commercially viable prepreg product using monomer or oligomer materials (hereinafter resins or reactive resins), the conversion of the reactive resin to a polymer needs to be greater than 90% and more commonly greater than 95%. Higher molecular weights of the thermoplastic polymers are also typically desired.

The systems and methods described herein are useful for manufacturing prepreg products using reactive resins. The resin conversion rate that is achieved via the systems and methods described herein is greater than 90% and more commonly greater than 95%. In most embodiments, the conversion rate of the resins is greater than 98% or even greater than 99%. In addition, the systems and methods described herein are able to achieve this high conversion rate utilizing a continuous process, wherein a fabric or mat material (woven or nonwoven) is essentially moved constantly or continually throughout the manufacturing process. The continuous process greatly increases the efficiency of the manufacturing process, which decreases the overall cost of the final prepreg product. For example, the manufacturing time between coating of the reactive resin (e.g., MMA, CBT, and the like) to the formation of a fully impregnated thermoplastic prepreg may be less than 20 minutes and commonly less than 10 minutes. In many embodiments, this processing time may be less than 5 minutes.

The systems and methods described herein are also able to achieve full and complete impregnation of the reinforcing fibers with the thermoplastic polymer. The low viscosity of the reactive resin material allows the resin to easily penetrate within and saturate the fabric or mat. The low viscosity of the reactive resin allows the resin to flow within and fully saturate either a single layer of the fabric or mat, or multiple layers of these materials. Accordingly, the systems and methods described herein are capable of producing prepregs that include multiple layers of materials with each layer being fully saturated or impregnated with the thermoplastic polymer materials. The final prepreg product can be made flexible with high content of reinforcing fibers. The prepregs may be rolled into a rolled product.

The embodiments described herein provide a process and apparatus that utilizes mixing of reactive resin components, followed by application of the reactive resin components to a fibrous media. The reactive resin components are then cured in an oven to form a fully impregnated thermoplastic prepreg having a thermoplastic polymer matrix. The systems described herein may be modified to accommodate the specific requirements of each reactive resin described herein, which enable polymerization of the reactive resins.

The term roving as used herein refers to a bundle of fibers that are positioned adjacent one another to form a rope, thread, or cord like component. A common type of fiber that is used in the rovings is glass fibers, although various other fibers could be used such as carbon fibers, basalt fibers, metal fibers, ceramic fiber, natural fibers, synthetic organic fibers such as aramid fibers, and other inorganic fibers. The term fabric or mat as used herein refers to woven or nonwoven materials. The woven materials are materials that are produced by weaving multiple roving strands together. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. The woven fabrics or cloths may be unidirectional, where all or most of the roving strands run or extend in the same direction, or may be bidirectional, wherein the roving strands run in two, typically orthogonal, directions. Various weaves may be used to form the fabric or mats described herein, including: plain weaves, twill weaves, satin weaves, multiaxial weaves, or stitching. The woven cloths or fabrics that are employed may contain any kind of woven fabric or multi-axial fiber material. The fabrics or mats may also contain chopped fibers in addition to or alternatively from the continuous fibers. The fabrics or mats may be a hybrid from different type of fibers. For ease in describing the embodiments herein, the embodiments will generally refer to the use of glass fibers, although it should be realized that various other fiber types may be used.

As briefly described above, nonwoven fiber mats are used in addition to or in place of the woven reinforcement fabrics. The nonwoven fiber mats are commonly formed of fibers that are entangled, needled, or meshed together rather than being woven in a uniform direction. The nonwoven fiber mats exhibit more uniform strength characteristics in comparison to the woven reinforcement fabrics. Stated differently, the strength of the nonwoven fiber mats is typically less directionally dependent so that a more uniform strength is achieved regardless of which direction the mat is tensioned. In comparison, the strength of the woven reinforcement fabrics are directionally dependent whereby the fabrics or cloths exhibit substantially more strength in a direction aligned with the fibers and less strength in a direction misaligned from the fibers. The reinforcement fabrics or cloths are substantially stronger than the nonwoven mats when the tension is aligned with the fibers. For ease in describing the embodiments herein, the embodiments will generally refer to fabrics or mats, which is intended to apply to both woven fabrics or cloths and nonwoven fiber mats.

The fibers used in the fabrics or mats may be treated with a sizing composition including coupling agent(s) that promote bonding between reinforcing fibers and polymer resin. For example, the fibers may be sized with one or more coupling agents that covalently bond the thermoplastic resin to the fibers. Exemplary coupling agents may include coupling agents having a silicon-containing moiety and a reactive acrylate or methacrylate moiety that may copolymerize with methyl methacrylate monomers during polymerization. Specific examples of coupling agents include (methacryloxypropyl)trimethoxysilane and (acryloxypropyl)trimethoxysilane.

The term thermoplastic polymer or material refers to polymers that are capable of being melted and molded or formed into various shapes multiple times. As such, the fully impregnated thermoplastic prepregs may be positioned in a mold and reformed or remolded into various desired shapes. Examples of polymer materials or resins that may be used with the embodiments herein include polymethacrylates, polyesters, and thermoplastic polyurethanes.

The description and/or claims herein may use relative terms in describing features or aspects of the embodiments. For example, the description and/or claims may use terms such as relatively, about, substantially, between, approximately, and the like. These relative terms are meant to account for deviations that may result in practicing and/or producing the embodiments described herein. For example, the claims and/or description may describe the fabric or mat being continuously moved through the process. A skilled artisan would recognize that some negligible stoppage or non-movement of the fabric or mat may occur without departing from the spirit of the disclosure herein. These deviations of differences may be up to about 10%, but are typically less than 5%, or even 1%. A similar rationale applies to any of the other relative terms used herein.

In producing conventional thermoplastic prepregs, the process of fully impregnating or saturating the fabric or mat is rather expensive and/or difficult due to the high melt viscosity of the thermoplastic polymer resin. In some instances, a solvent is added to the polymer resin/thermoplastic material to reduce the viscosity of the material. While the reduced viscosity may aid in fully impregnating the reinforcement fabric, the solvent needs to be subsequently removed from the fabric after the polymer resin/thermoplastic material is impregnated within the fabric. Removal of the solvent commonly involves heating the fabric to evaporate the solvent, adding cost and environmental concerns.

Other conventional technologies use pre-impregnated thermoplastic tapes of polymer resin and reinforcing fibers. These tapes are typically manufactured as a single layer by applying a molten polymer resin atop flattened rovings. For example, glass rovings may be passed over rollers to flatten and spread fibers that are then coated with a molten polymer resin. The tapes are then cooled with the glass fibers encased within the hardened polymer resin material. The tapes may then be used in producing other products, typically by stacking and consolidating several layers of tape together. The process of spreading fibers for resin impregnation typically limits to rovings; since spreading fibers in fabrics or mats is nearly impossible. In addition, the stacked tape is often rigid due to the polymer resin that impregnates the tape layers, which makes it difficult to mold intricate shapes.

In contrast to conventional prepregs, the production of the thermoplastic prepregs described herein is fast and simple. For example, fully saturating the fabric or mat is relatively easy since the reactive resin materials (e.g., MMA, CBT, and the like) have a low viscosity that is lower than 10.0 poises, more typically lower than 1.0 poise. This low viscosity allows the resin materials to easily flow within and fully saturate a single or multiple layers of the fabric or mat. The capillary force of the rovings or fibers further aids in saturating the fabric or mat with reactive resins. The low viscosity of these materials also allows the materials to be applied to a constantly or continually moving sheet of material. The resins may then be converted into a thermoplastic polymer material so that the resulting fabric or mat is fully impregnated with the thermoplastic resin.

While the embodiment herein generally refers to the manufacture of polymethyl methacrylate prepregs, other reactive resin systems can be easily adapted to work with the same or similar apparatus to form thermoplastic prepregs including polyesters and thermoplastic polyurethanes, and blends of thermoplastic polymers.

Having described several aspects of the embodiments generally, additional aspects will be evident with reference to the description of the several drawings provided below.

Systems

Figure 2:
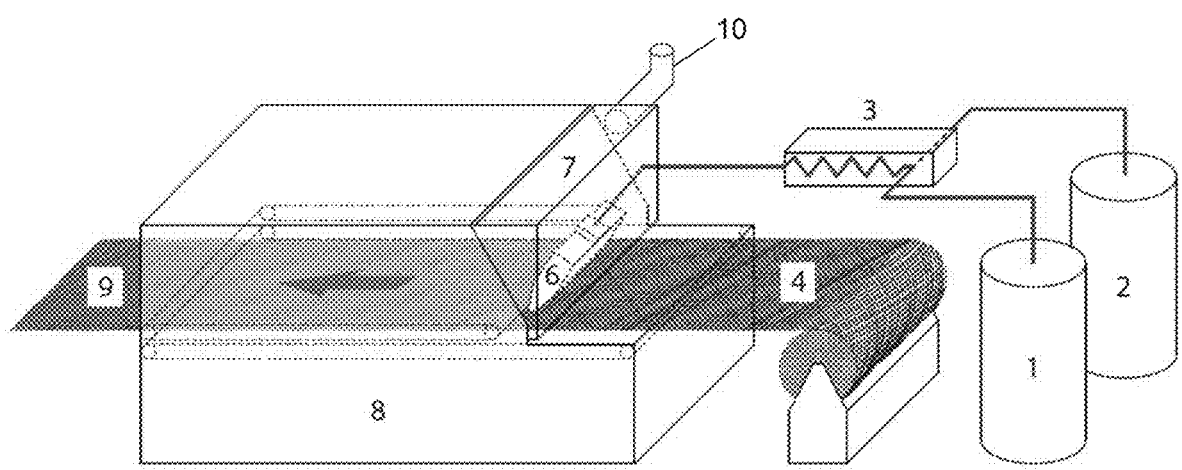

Referring now to FIGS. 1 and 2, illustrated is a system that may be used to produce prepregs that are fully impregnated with any of the thermoplastic polymers described below. The various monomers or oligomers that may polymerize to form thermoplastic polymers will generally be referred to hereinafter as reactive resins. FIGS. 1 and 2 illustrate a general configuration of the system that may be used. Any specific modifications of the system and/or components that may be added or removed from the system are described in greater detail in the specific sections below describing the various reactive resins.

The systems of FIGS. 1 and 2 are capable of producing the fully impregnated thermoplastic prepregs in a continuous process, wherein a fabric or mat 4 is continually or constantly in movement through the system. Stated differently, the term continuous process means that the process is not interrupted or paused in performing any one process step. Rather, each step in the process is continually or constantly being performed. For example, the fabric or mat is continually moved from a rolled good, coated with the reactive resin material, cured in the oven, and rolled into a final product. In contrast, conventional systems typically are halted or interrupted during the performance of one or more steps, such as the impregnation of fibrous substrates with high melt viscosity thermoplastic polymer resin.

In some embodiments, the system includes two vessels or holding tanks (i.e., 1 and 2). The holding tanks, 1 and 2, may be heated. One of the holding tanks (e.g., holding tank 1) may contain the reactive resin. The other holding tank (e.g., tank 2) may contain an initiator and/or catalyst as specifically described below for each reactive resin. The holding tanks, 1 and 2, may be heated to a temperature that aids in forming the application and/or polymerization process. Specific details on the contents of the holding tanks and/or any heating are described in greater detail below. In some embodiments the system may include a single holding tank, which may include only the reactive resin or a combination of the reactive resin and an initiator and/or catalyst.

The reactants from the two holding tanks, 1 and 2, may be metered into a static mixer or mixing head 3 that ensures the correct ratio of the reactive resin and any initiator and/or catalyst. The components from the two holding tanks, 1 and 2, are thoroughly mixed in the static mixer 3 into a substantially homogenous mixture. In some embodiments the static mixer 3 may not be used, such as when a single holding tank (e.g., tank 1) is employed.

A fabric or mat 4 is unwound or otherwise provided to the system. The system may include a mechanism that unwinds the fabric or mat and moves the fabric or mat through the system and along or about the various processes. In some embodiments, the mechanism may include powered rollers or calendars, a conveyor system, or a double belt compression oven, that move the fabric or mat 4 through the system.

In some embodiments, the initiator and/or catalyst (hereinafter polymerization component) may be included on the surface of the fibers. When the fabric or mat 4 includes the polymerization component, only a single holding tank (e.g., tank 1) containing the reactive resin may be used, or a reduce amount of the polymerization component may be contained in the second holding tank (e.g., tank 2) and/or mixed with the reactive resin in the single holding tank (e.g., tank 1). In some embodiments, two holding tanks, 1 and 2, may be used and each holding tank may include a different reactive resin material described below. For example, a first holding tank 1 may include methyl methacrylate (MMA) monomers while the second holding tank 2 includes cyclic butylene terephthalate (CBT). In such instances, a combination of two or more types of reactive resins may be applied to the fabric or mat.

The fibers of the fabric or mat 4 may also be treated with a sizing component, such as a mixture of silane coupling agents, polymeric film formers, and other additives that are designed to enhance the interfacial bonding between the glass fiber and the reactive resin. For example, a reactive silane may have a polymerizable moiety that copolymerizes with monomers or oligomers, thus improving the coupling between the reinforcing fibers and the thermoplastic resin matrix to improve composite properties.

In some embodiments, after the fabric or mat 4 is unwound, or during the unrolling of the fabric or mat, the fabric or mat may be subjected to a preheating operation. The preheating operation may be performed to heat the fabric or mat 4, such as to aid in polymerization of the reactive resin and/or to remove residual moisture from one or more surfaces of the fabric or mat. As illustrated in FIG. 1, an infrared heater 5 may be used to raise the temperature of the fabric or mat 4 prior to coating the reactive resin on the fabric or mat. The preheating of the fabric or mat 4, and/or the preheating of the reactive resin, may be employed to prevent the reactive resin from solidifying upon contact with the fibers of the fabric or mat 4, which may ensure a good wet out of the resin at higher line speeds. In a specific embodiment, the infrared heater 5 may be positioned atop or over the fabric or mat 4 to heat the fabric or mat. In some embodiments, a second heater (not shown) can be positioned on an opposite side (e.g., bottom side) of the fabric or mat 4 to further aid in preheating the fabric or mat. In other embodiments, a preheating oven may be used in place of or in addition to the infrared heater 5. In some embodiments, the temperature of the preheating mechanism may be greater than a polymerization temperature of the reactive resin. As shown in FIG. 2, in some embodiments the system may not include a preheating system or assembly, such as the infrared heater 5. Such embodiments may be especially useful when the reactive resin is highly sensitive or dependent on temperature.

The reactive resin is then applied to the fabric or mat 4 using a slot die 6 or other resin application mechanism. The slot die 6 may be positioned atop or adjacent one or more surfaces of the fabric or mat 4. In some embodiments, the resin mixture is typically applied as close as possible to an inlet of the curing oven 8. This may be done to minimize exposure of the reactive resin to the surrounding air, to minimize evaporative vapors of the reactive resin, to minimize temperature increases or decreases of the reactive resin from the surrounding environment, and the like. The slot die 6 may be positioned directly adjacent to the inlet of the curing oven 8. In some embodiments, the slot of the slot die 6 may have an opening of about 1.0 mm or less that enables the use of a very thin die. The thin die allows the distal end of the die to be positioned substantially close to the curing oven 8 to minimize the exposure of the resin mixture to the surrounding environment. In some embodiment, the distal end of the slot die 6 may be positioned within 1.0 inches of the curing oven's inlet, and preferably within 0.5 inches of the inlet. The slot die 6 may be temperature controlled in order to achieve a temperature range as specified in the description of the respective reactive resins. The slot die 6 may include a thermocouple and heating cartridge or other heating component to ensure that the slot die 6 remains within the desired temperature range.

While the embodiment herein utilizes a slot die 6 for application of the resin mixture to the fabric or mat 4, the low viscosity of such systems allows a wide range of application technologies including, but not limited to, spray application, curtain coating, dip and squeeze coating, kiss roll application, doctor blade application, or even powder coating of pre-ground solid resins where the curing oven can also be utilized to melt the reactive components.

The system may include a hood or enclosure 7 that is fully covers or encloses at least a portion of the fabric or mat 4. In some embodiments, the hood or enclosure 7 may be integrally formed with the oven 8, such as by forming or defining a proximal front end of the oven 8. In other embodiments, the hood or enclosure 7 may be a separate component that is attached to the front of the oven 8. For example, the hood or enclosure 7 may be a separate component that is removably coupleable with a proximal front end of the oven 8. In either instance, the hood or enclosure 7 may be configured to fully cover and enclose the die 6. In such embodiments, the reactive resin may be applied to the fabric or mat 4 without being exposed to the surrounding environment, or with minimal exposure to the surrounding environment. Stated differently, the reactive resin may be applied to the fabric or mat 4 while being fully enclosed or covered by the hood or enclosure 7 and/or curing oven.

The hood or enclosure 7 may include ports, apertures, other features that allow the fluid lines of the die 6 to be positioned through a front surface of the hood or enclosure 7. One or more exhaust components 10 may be fluidly coupled with the hood or enclosure 7 and may be configured to remove exhaust gases and/or other gases from the hood or enclosure 7. The exhaust component may include various fluid lines, ports, pumps, valves, purge valves, or other components. Exhausting the gases may be important when vapors from the reactive resin and/or any other materials are present within the hood or enclosure 7. Exhausting these gases may also reduce or eliminate exposure of these substances to workers or other individuals. In some embodiments, a fluid inlet component (not shown) may also be attached to the hood or enclosure 7. The fluid inlet component may include various fluid lines, ports, pumps, valves, and the like, and may be used to introduce various gases or substances that may aid in polymerization of the reactive resin and/or control/maintain a desired environment within the hood or enclosure 7.

The liquid handling lines between the tank(s), 1 and/or 2, and the static mixer 3 and/or between the mixer 3 and the slot die 6 may be insulated to minimize heat loss as the reactive resin and/or polymerization component flows through the handling lines. In some embodiments, the liquid handling lines are heated in addition to being insulated to ensure that the liquid materials (e.g., reactive resins and/or polymerization component) are maintained within a constant temperature range. The temperature may be maintained within the ranges described below for the various reasons described herein, such as to prevent solidification of the reactive resins, to control viscosity, and the like. The system may also be configured to recirculate the liquid materials as desired, such as to prevent or minimize material build up in the system and/or liquid handling lines.

After the fabric or mat 4 is coated and/or saturated with the reactive resin, the reactive resin impregnated fabric or mat 4 is then passed through a curing oven 8. The temperature of the curing oven 8 is maintained at the temperatures described below to ensure the completion of the polymerization of the reactive resin to a thermoplastic polymer. Stated differently, the curing oven 8 is maintained above a polymerization temperature at which the monomers and/or oligomers start to polymerize. The coated fabric or mat 4 may be exposed to the curing oven 8 for a time which is sufficient to ensure complete polymerization of the reactive resin material. When the reactive resin composition is a combination of two or more types of reactive monomers and/or oligomers described below, the heating temperature of the resin-fiber mixture may be chosen to be above the threshold polymerization temperatures of all the reactive resins. Alternatively, the heating temperature of the resin-fiber mixture may be chosen to be above a threshold polymerization temperature of one type of monomer/oligomer but below a threshold polymerization temperature of the other type of monomer/oligomer.

In some embodiments, the coated fabric or mat 4 is subjected to a press mechanism that facilitates in complete wet-out of the reinforcing fibers by the reactive resin. In one embodiment, the press mechanism may include one or more calendars that press or squeeze the reactive resin through the fabric or mat 4. In another embodiment, the curing oven 8 may be a double belt compression oven where the pressure on the belts is adjustable to facilitate complete wet-out of the reinforcing fibers by the reactive resin.

Upon exiting the curing oven 8, the fully impregnated thermoplastic prepreg 9 may be collected. In some embodiments, the system includes a winding mechanism that is configured to wind the fully impregnated thermoplastic prepreg 9, which is relatively flexible in comparison with conventional prepregs, due to the high content of reinforcing fibers that can be achieved with the process in the instant invention. In other embodiments, the fully impregnated thermoplastic prepreg may be cut into sheets, which may be stacked atop one another.

The systems of FIGS. 1 and 2 are designed so that the above process is able to be performed in a time of 20 minutes or less, and more commonly 10 minutes or less. In some embodiments, the process may be performed in 5 minutes or less. Specifically, the time period between when the fabric or mat 4 is initially unwound to when the fully impregnated thermoplastic prepreg exits the curing oven 8 may be 20 minutes or less, 10 minutes or less, or in some embodiments 5 minutes or less. This speed and impregnation efficiency is not achievable via conventional systems using polymer resin materials. Moreover, the speed and efficiency is not drastically affected when multiple stacked layers of the fabric or mat 4 are employed. Rather, the low viscosity of the reactive resins described below are able to easily penetrate through and saturate the multiple stacked layers of fabric or mat 4 so that the processing time of the stacked layers of the fabric or mat remains low. Full impregnation of the stacked layers of the fabric or mat 4 is achievable due to the low viscosity of the reactive resin materials.

Exemplary Reactive Resins

Described below are various reactive resins that may be utilized or employed in forming the fully impregnated thermoplastic prepregs described herein. The reactive resins may be used in isolation to form the prepreg, or in some embodiments may be used in combination to form the prepregs. The systems illustrated in FIGS. 1 and 2 and described above may be used with each of the reactive resins described below to form the fully impregnated thermoplastic prepregs. Specific modifications to the above systems that may be required when using the specific reactive resins will be described in the respective section for each resin.

Polymethyl Methacrylate (PMMA)

In some embodiments, methyl methacrylate (MMA) monomers may be applied to the fabric or mat and subsequently reacted to form polymethyl methacrylate (PMMA). The (MMA) monomers are liquid at room temperatures and have a very low viscosity (e.g., lower than 1.0 poise). Free radical polymerization of the MMA monomer into its polymer PMMA is usually conducted at temperature between 40° C.-100° C. using an initiator, such as an organic peroxide. An exemplary organic peroxide is a low viscosity aqueous benzoyl peroxide, such as Luperox® EZ-FLO that is commercially available from Arkema S. A. In some embodiments, the MMA monomer alone or in isolation may be added to the fabric or mat. Stated differently, the material that is applied to the fabric or mat via tanks 1 and/or 2 may include greater than 90% MMA monomer, greater than 95% MMA monomer, or even greater than 98 or 99% MMA monomer. In such embodiments, a single tank (i.e., either tank 1 or 2) may be used in the above described system.

During polymerization of the MMA monomer, the density of the resin typically increases from about 0.9 g/cm$^3$ to 1.2 g/cm$^3$ and the matrix resin typically experiences shrinkage. As such, in some embodiments a polymer material may be added to the MMA resin in order to reduce shrinkage. The polymer material may be polymethyl methacrylate (PMMA). The PMMA may dissolve in the MMA to form a homogenous liquid. The PMMA to MMA material ratio may be controlled to decrease shrinkage upon polymerization and without substantially increasing the viscosity or otherwise maintaining a low viscosity, for example below 10 poises.

In conventional infusion processes, shrinkage of the reactive resin material may alter the alignment of the fibers in the fabric or mat and/or cause other changes, which may affect the structural integrity of the final product. In the instant invention, reinforcing fibers in the fabric or mat are under tension during the manufacturing of prepreg, therefore fiber shifting is minimized. On the other hand, one advantage of the PMMA impregnated prepreg that results from the systems described herein is that no additional shrinkage, or a negligible amount of additional shrinkage, occurs during post processing of the prepreg. Stated differently, all or most of the shrinkage that may occur during polymerization of the reactive resin occurs during the formation of the fully impregnated thermoplastic prepreg and not during subsequent thermoforming, thermomolding, or other processing, such as in the formation of the final product as described herein.

As described briefly above, MMA monomers are sensitive to heat. For example, MMA typically boils at around 101° C. Evaporation of the MMA resin may also be relatively high due to the relatively low boiling point of the material. Because of the relatively low boiling point, it is important to ensure that any applied heat is maintained within a controlled range below about 100° C. The polymerization rate of MMA material is also highly dependent on temperature. For example, a temperature that is lower than 40° C. may result in an incomplete polymerization of the MMA material and/or substantially increases the polymerization time. On the other hand, a temperature that is too high results in a substantial evaporation of the MMA resin. To ensure that the MMA resin is fully polymerized in a short amount of time while minimizing evaporation of the resin, the temperature of the oven 8 may be maintained within a temperature range of between 40° C. and 100° C., and more commonly between 60° C. and 80° C.

Because of the MMA resin's sensitivity to heat, it may be preferable to use the oven configuration of FIG. 2 that does not include a pre-heating assembly 5. The oven configuration of FIG. 2 may minimize evaporation of the MMA resin by ensuring that the resin is not overly heated prior to entering the oven 8. In such embodiments, the MMA resin may be pre-heated in the tank (i.e., tank 1 and/or 2) to bring the MMA resin to a desired temperature before it is applied to the fabric or mat. For example, the MMA resin may be pre-heated above 40° C. and below 80° C. (e.g., to around 60° C.) in the tank and then applied to the fabric or mat. Pre-heating the MMA resin may aid in quickly polymerizing the MMA resin after it is applied to the fabric or mat 4 by reducing the temperature difference between the MMA resin and the oven 8. Maintaining the MMA resin at above 40° C. and below 80° C., and preferably at around 60° C., also minimizes evaporation of the MMA resin. In other embodiments, the oven configuration of FIG. 1 may be used, but the pre-heating assembly 5 may be tightly controlled to ensure that the temperature of the fabric or mat remains below a certain temperature, such as 100° C. or 80° C.

To further reduce or eliminate evaporation issues, the die 6 may be positioned close to the entrance of the oven 8. For example, the die 6 may be positioned within 6 inches of the oven's entrance, or more preferably within 4 inches or 2 inches. The die 6 may have a narrow application end as described herein to enable the end of the die 6 to be positioned extremely close to the oven's entrance. In another embodiment, the die 6 may be positioned within the hood or enclosure 7 so that the fabric or mat passes into the hood or enclosure 7 before the MMA resin is applied. The hood or enclosure 7 may be integrally formed with the oven 8, or may be a separate component that is attached to the front of the oven 8 to cover the die 6. For example, the hood or enclosure 7 may be a separate component that is removably coupleable with the oven 8. In such embodiments, the hood or enclosure 7 may include ports, apertures, and other features that allow the fluid lines of the die to be positioned through a front surface of the hood or enclosure 7. Any MMA resin vapors due to evaporation of the material may be removed from the hood or enclosure 7 via exhaust line 10 that is fluidly coupled with the hood or enclosure 7 and/or the oven 8. The hood or enclosure 7 may be not be heated or may form a portion of the oven 8 that is not heated so as to prevent or minimize evaporation of the MMA resin.

In some embodiments, the oven 8 is a double belt press oven having a pair of belts that are positioned on opposing surfaces of the fabric or mat so that the fabric or mat is sandwiched between the belts. The pair of belts may apply pressure to the sandwiched fabric or mat, which may aid in spreading the MMA resin throughout the fabric or mat. In some embodiments, the sizings of reinforcing fibers (e.g., glass fibers) of the fabric or mat could be tailored to have a functional group that covalently bonds with the PMMA resin, which may result in a better bond between the fibers and PMMA resin. For example, the glass fiber sizings may contain acrylate or methacrylate functional silanes. Acrylate or methacrylate functionality of the silane coupling agents can copolymerize with MMA, thereby improving bonding between the PMMA resin matrix and the reinforcing fibers.

Unlike other reactive resins, the MMA resin is not sensitive to moisture. As such, the oven system or configuration does not need to include components that minimize moisture, such as a moisture free gas application component and/or moisture free hood or enclosure. The fabric or mat 4 also does not need to be pre-heated as in other oven configurations or systems. The MMA resin is highly reactive and thus, the polymerization need only be started or initiated with heating from the oven 8 or another component prior to the oven (e.g., pre-heating assembly 5). In such embodiments, the oven 8 temperature may be controlled to manage the resulting exothermic polymerization of the MMA resin.

As briefly mentioned above, the resin application system may include a single tank or multiple tanks. When a single tank is used (e.g., tank 1 of FIG. 1 or 2), the MMA resin and/or a pre-polymer (i.e., a mixture of the MMA monomer and PMMA polymer) may be contained in the single tank. In some embodiments, the initiator may also be included with the MMA resin and/or pre-polymer in the single tank. In such embodiments, the liquid solution in the single tank is maintained at a low temperature (i.e., below 30° C.) to minimize premature polymerization of the material. In other embodiments, the initiator may be pre-applied to the fabric or mat 4 and not included within the MMA resin and/or pre-polymer in the single tank, or may be included at very low levels. In such embodiments, the temperature of the liquid solution may be higher since premature polymerization is of less concern.

When multiple tanks are used (e.g., tanks 1 and 2 of FIG. 1 or 2), one of the tanks (e.g., tank 1) may include the MMA resin monomer and/or pre-polymer solution while the other tank (e.g., tank 2) includes the initiator. The initiator and MMA resin/pre-polymer may be mixed via mixer 3. The temperatures of the two tanks, 1 and 2, may be maintained at a temperature of between 40° C. and 80° C., and more commonly 60° C., since premature polymerization is not of concern.

Polyesters

Figure 3:
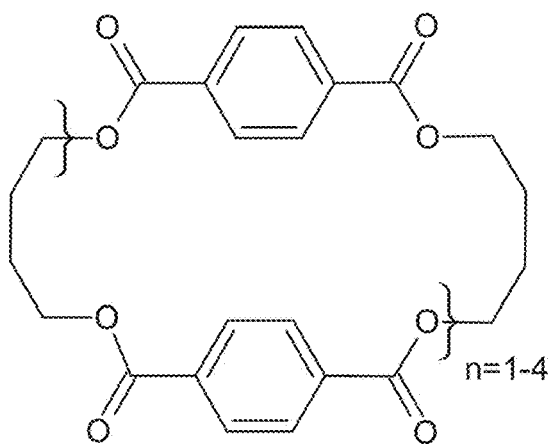
FIG. 3 illustrates a molecular structure of cyclic butylene terephthalate (CBT).

In some embodiments, macrocyclic polyester oligomers may be applied to the fabric or mat 4 and subsequently reacted to form a polyester prepreg. The macrocyclic polyester oligomers, such as cyclic butylene terephthalate (CBT)

and cyclic ethylene terephthalate (CET), can be polymerized to form polyesters such as polybutylene terephthalate (PBT) and polyethylene terephthalate (PET) through ring-opening polymerization. Cyclic butylene terephthalate (CBT) is a mixture of cyclic oligomers of butylene terephthalate. FIG. 3 illustrates the molecular structure of CBT.

CBT oligomers can be polymerized into PBT using a variety of catalysts. Suitable catalysts include organo-tin and/or organo-titanate compounds. Exemplary organo-tin catalysts include monoalkyl tin(IV) hydroxide oxides, monoalkyl tin(IV) chloride dihydroxides, dialkyl tin(IV) oxides, bistrialkyl tin(IV) oxides, monoalkyl tin(V) tris-alkoxides, dialkyl tin(IV) dialkoxides, and trialkyl tin(IV) alkoxides, among other tin-containing compounds. Exemplary organo-titanate catalysts include titanate tetraalkoxide compounds and tetraalkyl titanate compounds (e.g., tetra(2-ethylhexyl) titanate), among others.

Macrocyclic polyester oligomers, such as CBT, are solid at room temperature and therefore the tank that contains the macrocyclic polyester oligomers (e.g., tank 1 or 2) and the fluid lines that transport the macrocyclic polyester oligomers are typically heated and insulated at above the melting point of the polyester oligomer materials. In many instance, the polymerization temperature of the macrocyclic polyester oligomers is slightly higher than the melting temperature. As such, there is typically a tight temperature range or window for processing CBT resins.

For example, the melting point of CBT is approximately 160° Celsius (e.g., between 150° C.-190° C.) while the polymerization temperature of CBT typically occurs at a temperature greater than 180° C. (e.g., between 180° C.-220° C.). As such, the difference in the melting temperature and the polymerization temperature is roughly about 20° C. on average. Due to the close proximity between CBT's melting temperature and polymerization temperature, the macrocyclic polyester oligomer and the catalyst should not be mixed in tank (e.g., tank 1 or 2), in order to prevent premature polymerization.

In other embodiments, premature polymerization or undesired mixing of the catalyst and macrocyclic polyester oligomer may be prevented by applying the catalyst to the reinforcing fibers of the fabric or mat 4. The catalyst may be applied to the reinforcing fibers as part of a sizing package. Exemplary methods of applying the catalyst to the reinforcing fibers is described in U.S. patent application Ser. No. 12/913,326, filed Oct. 27, 2010, entitled "Fibers Treated With Polymerization Compounds and Fiber Reinforced Composites Made Therefrom", the entire disclosure of which is incorporated by reference herein.

In yet other embodiments, the system may include two tanks (e.g., tanks 1 and 2) where the macrocyclic polyester oligomer is contained in one tank (e.g., tank 1) and the catalyst is contained in the other tank (e.g., tank 2). In such embodiments, the macrocyclic polyester oligomer and catalyst may be mixed at the mixer 3, prior to the application of the reactive resin mixture to the fabric or mat 4.

Upon application of the mixture of the macrocyclic polyester oligomer and catalyst to the fabric or mat 4, the coated fabric or mat is immediately fed into the oven 8. In some embodiments, the fabric or mat 4 may be pre-heated via pre-heating assembly. Pre-heating of the fabric or mat 4 may ensure that the macrocyclic polyester oligomer does not solidify upon, or subsequent to, application to the fabric or mat 4. For example, because the macrocyclic polyester oligomer is maintained at close to its melting temperature (e.g., 160° C.) in the holding tank and/or fluid lines, application of the macrocyclic polyester oligomer to an ambient temperature fabric or mat 4 may cause the macrocyclic polyester oligomer to begin to solidify. To counter this possible effect, one or more surfaces of the fabric or mat 4, or the entire fabric or mat, may be pre-heated to near or above the melting temperature of the macrocyclic polyester oligomer. In some embodiments, one or more surfaces of the fabric or mat 4, or the entire fabric or mat, may be pre-heated to between 100° C. and 200° C., more commonly between 140° C. and 180° C., and most commonly between 160° C. and 180° C.

In some embodiments, one or more surfaces of the fabric or mat 4, or the entire fabric or mat, may be pre-heated above the polymerization temperature of the macrocyclic polyester oligomer. For example, one or more surfaces of the fabric or mat 4, or the entire fabric or mat, may be pre-heated to a temperature greater than 180° C., greater than 200° C., or even greater than 220° C. These temperatures of the fabric or mat 4 may be sufficient to cause or begin polymerization of the macrocyclic polyester oligomer upon application of the macrocyclic polyester oligomer and prior to the fabric or mat entering the oven 8. Such polymerization of the macrocyclic polyester oligomer is typically not a concern, however, since the fabric or mat 4 is commonly directed immediately into the oven 8 where full polymerization of the macrocyclic polyester oligomer is achieved.

Thermoplastic Polyurethanes

In some embodiments, components of thermoplastic polyurethane materials (TPU) may be applied to the fabric or mat 4 and subsequently reacted to form a TPU prepreg. TPUs are synthesized by the reaction of pre-polymers possessing isocyanate (NCO) end groups with curatives. Typically, a pre-polymer is synthesized by reacting a long chain polyol with diisocyanates to form a molecule with reactive isocyanate groups on both chain ends. Depending on the requirements of the end application, long chain polyols of the polyether type and polyester type may be used to make pre-polymers.

The pre-polymers can be cured with a wide variety of curatives to form TPUs. The choice of curatives depends on the required physical and chemical properties as well as the processing and curing conditions. Typical curatives for TPUs are difunctional, such as diamines, diols, and hydroxy amines. The reaction between the pre-polymer and the curative forms urethane links (in the case of diol curative) or urea links (in the case of diamine curative).

Isocyanate functionalities in the pre-polymers are very reactive, and will react readily with hydroxyl or amino groups on curative molecules. Therefore the mixture of pre-polymer and curative has a limited life. In conventional processes that involve casting of thermoplastic polyurethane, it is often required that the pre-polymer-curative mixture be prepared right before they are used for casting. The limited life of the pre-polymer-curative mixture limits the processing window of composite manufacturing processes. In the system described herein, the two tanks (e.g., tanks 1 and 2) allow the reactants to be separated. The two reactants may be mixed (e.g., via static mixer 3) immediately prior to application of the material to the fabric or mat 4, thereby eliminating limited life issues associated with conventional pre-polymer-curative mixtures. In such embodiments, one of the tanks (e.g., tank 1) may include the pre-polymer (e.g., with isocyanate functional groups at both chain ends) while the other tank (e.g., tank 2) includes the curative.

Alternatively, the system may employ a single tank. In such embodiments, the pre-polymer may be contained in the single tank (e.g., tank 1). The curative may be applied onto the reinforcing fibers as part of a sizing package so that the two components are mixed upon application of the prepolymer to the fabric or mat 4. In some embodiments, part or the entire curative can be applied onto reinforcing fibers as a sizing ingredient. Applying the curative onto the reinforcing fibers may enable the reduction of curative in a separate tank (e.g., tank 2) or completely eliminate the tank for the curative.

In some embodiments, it may be desirable to reduce the moisture content of the fabric or mat 4. In such embodiments, the fabric or mat 4 may be pre-dried via pre-heating assembly 5.

Polycarbonates

In some embodiments, reactive components of polycarbonates may be applied to the fabric or mat 4 to form a fully impregnated thermoplastic prepreg. Specifically, macrocyclic Bisphenol-A oligomers can be polymerized into polycarbonate (PC) through ring opening polymerization, using alkali metal based initiators such as sec-butyllithium, and sodium- and potassium naphthalene. The polymerization may be conducted at a temperature between 240° C. and 280° C. and may use anionic initiators. For example, when polymerized at 250° C., high molecular weight polycarbonates can be formed within 2-5 minutes.

In some embodiments, the system includes a two tank arrangement as shown in FIGS. 1 and 2. In such embodiments, one of the tanks (e.g., tank 1) may contain the macrocyclic Bisphenol-A oligomers while the other tank (e.g., tank 2) includes the initiator. The oligomer and initiator may be mixed via static mixer 3 and applied via die 6. The fabric or mat 4 may then be passed through the oven 8 in a continuous process as described above to form the PC prepreg.

Exemplary Prepreps

The above system may be used to manufacture a fully impregnated thermoplastic prepreg. The thermoplastic prepreg may include a fabric or mat. In one embodiment, the fabric or mat may include a plurality of rovings that are woven together. Each roving may contain a bundle of continuous glass fibers or any other fibers. In another embodiment, the fabric or mat may include a plurality of entangled and intermeshed fibers that are randomly oriented. The prepreg also includes a thermoplastic polymer that is fully impregnated within the fabric or mat. The thermoplastic polymer is formed by reacting one or more reactive resins described above to form the thermoplastic polymer. The reactive resin(s) is typically mixed with a polymerization component that aids in the polymerization process. As described herein, greater than 90%, 95%, 98%, or even 99% of the reactive resin reacts to form the thermoplastic polymer. When the fully impregnated thermoplastic prepreg is subjected to a subsequent heating and/or pressure process, the thermoplastic polymer melts or softens to allow the thermoplastic prepreg to be molded or formed into a composite part.

In some embodiments, the fully impregnated thermoplastic prepreg is a rolled product. The thermoplastic prepreg may be subsequently formed into a composite part. For example, one or more layers of the thermoplastic prepreg may be compression molded into a desired composite part. Exemplary techniques for forming the prepregs into the fiber-reinforced composite articles may include compression molding of a single prepreg layer, multiple prepreg layers, and/or pellets of prepreg material into the fiber-reinforced article. When the prepreg includes partially-polymerized resin, the compression molding process may include a heating step (e.g., hot pressing) to fully polymerize the resin.

Heat may also be used in the compression molding of fully-polymerized prepregs to melt and mold the prepreg into the shape of the final article.

The prepregs may also be used to in conjunction with other fibers and resin materials to make the final composite article. For example, the prepreg may be placed in selected sections of a tool or mold to reinforce the article and/or provide material in places that are difficult to reach for thermoset and/or thermoplastic resins. For example, the prepregs may be applied to sharp corners and other highly structured areas of a mold or layup used in reactive injection molding processes (RIM), structural reactive injection molding processes (SRIM), resin transfer molding processes (RTM), vacuum-assisted resin transfer molding processes (VARTM), spray-up forming processes, filament winding processes, and long-fiber injection molding processes, among others. The prepreg may also be used as local reinforcement or for overmolding during injection and compression molding processes including LFT (long fiber thermoplastic) and D-LFT (direct-long fiber thermoplastic).

Exemplary composite products that may be formed from the prepregs include: automotive components, wind turbine blade components, building and construction components, electrical components, sports and leisure components, and/or other components. Exemplary automotive components includes: cockpit, seats, instrument panels, side beams, bottom plate, bottom plate side beam, door trims, body panels, openings, underbody, front/rear modules, engine compartment, engine covers, battery trays, oil pans, bonnets/hoods, fenders, spoilers, and the like.

Exemplary wind turbine blade components include: spar cap, shells, root inserts, and the like. Exemplary building and construction components include: columns, pediments, domes, panels, window profiles, ladder rails, and the like. Exemplary electrical components include: light poles, circuit boards, electrical junction boxes, and the like. Exemplary sports and leisure components include: golf club shafts, golf trolleys, and the like. Other components that may be formed form the prepregs include: components for mass transportation, agricultural equipment, and trailers/RV including passenger seats, standbacks, wall claddings, floor panels, large panels for trailer walls, truck and tractor cabs, bus body shells, cargo containers, and the like.

In a specific embodiment, a battery tray or compartment for an electric car or vehicle may be molded using the fully impregnated thermoplastic prepregs described herein. The battery compartment may be molded from a single piece of the prepreg material, thereby eliminating the need to use unidirectional tape on the corners or edges to reinforce these areas of the battery compartment, as is done in conventional processes.

Methods

Exemplary methods are described herein. While the methods generally relate to systems that are configured to apply methyl methacrylate (MMA) resins, it should be realized that the methods and/or systems may be modified as described herein to accommodate the other reactive resins. Accordingly, the methods are not limited to the application of MMA resins.

Figure 4:
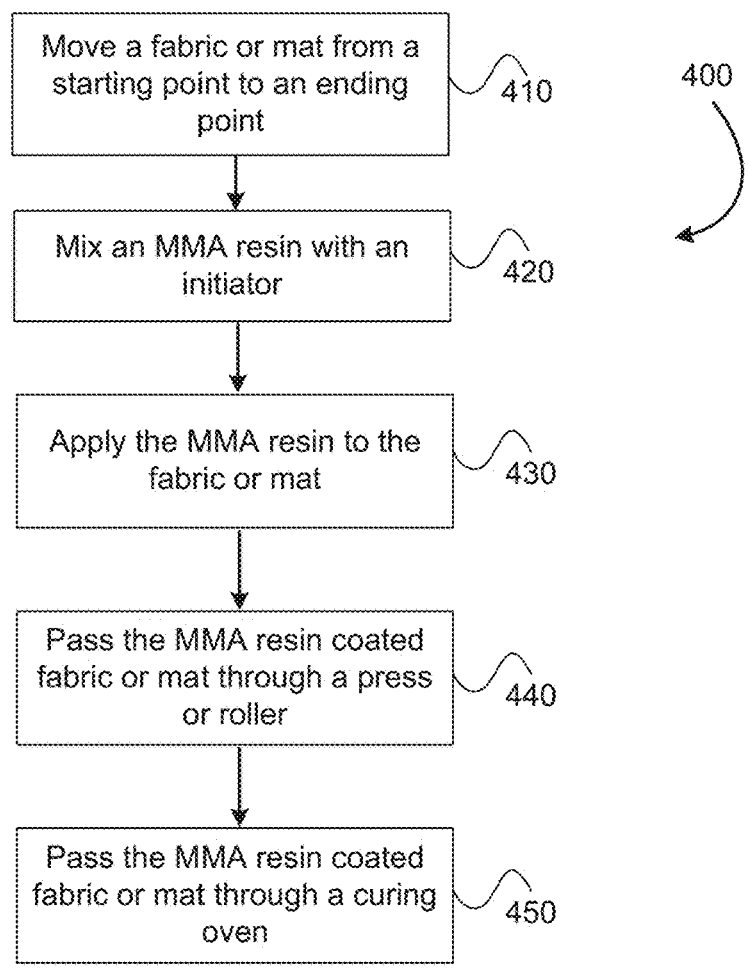
FIG. 4 illustrates a method of forming a fully impregnated thermoplastic prepreg product.

Referring now to FIG. 4, illustrated is an embodiment of a method 400 of forming a fully impregnated polymethyl methacrylate thermoplastic prepreg. At block 410, a fabric or mat is moved from a starting point to an ending point. The fabric or mat is subjected to a plurality of processes during movement of the fabric or mat between the starting point and ending point. The fabric or mat is also in substantially constant movement between the starting point and ending point. At block 420, methyl methacrylate (MMA) resin is mixed with an initiator to form an MMA resin mixture. The initiator facilitates in polymerizing the MMA resin to form polymethyl methacrylate (PMMA).

At block 430, the MMA resin mixture is applied to the fabric or mat. At block 440, the MMA resin mixture coated fabric or mat is passed through a calendar or press to press the MMA resin mixture entirely through the fabric or mat such that the MMA resin mixture fully saturates the fabric or mat. At block 450, the MMA resin mixture coated fabric or mat is passed through a curing oven having a temperature that is maintained at between 40° C. and 100° C., and more commonly 60° C. and 80° C., to polymerize the MMA resin and thereby form PMMA. Upon exiting the curing oven, the fabric or mat is fully impregnated with PMMA. Greater than 95%, 98%, or even 99% of the MMA resin may be polymerized to form PMMA.

In some embodiments, the MMA resin is mixed with the initiator in a mixing component prior to application of the MMA resin to the fabric or mat. The MMA resin may include a mixture of an MMA monomer and a PMMA polymer. The MMA resin mixture may be applied to the fabric or mat via a die that is positioned within a hood or enclosure that covers and encloses at least a portion of the fabric or mat. In such embodiments, the method may also include exhausting vapors within the hood or enclosure via an exhaust component.

The curing oven may include a double belt compression oven. In such embodiments, steps 440 and 450 (i.e., passing the fabric or mat through a press and through an oven) may occur simultaneously. The method may further include winding the fully impregnated PMMA thermoplastic prepreg into a roll product.

Figure 5:
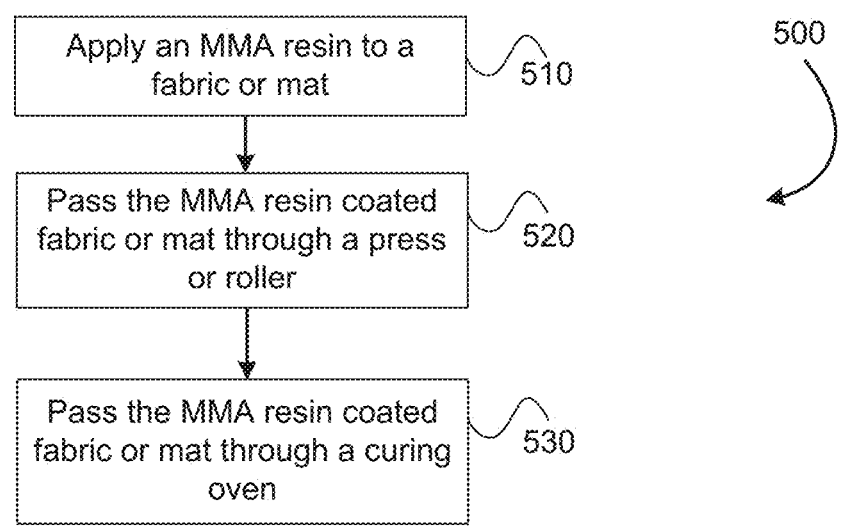
FIG. 5 illustrates another method of forming a fully impregnated thermoplastic prepreg product.

Referring now to FIG. 5, illustrated is a method 500 of forming a fully impregnated polymethyl methacrylate prepreg product. At block 510, a methyl methacrylate (MMA) resin is applied to a fabric or mat. The MMA resin is combined with an initiator that facilitates in polymerizing the MMA resin to form polymethyl methacrylate (PMMA). At block 520, the MMA resin coated fabric or mat is passed through a calendar or press to fully saturate the fabric or mat with the MMA resin. At block 530, the MMA resin saturated fabric or mat is passed through a curing oven to polymerize the MMA resin throughout the fabric or mat and thereby form the fully impregnated PMMA prepreg. The fabric or mat is constantly moved during the above process and the above process occurs in a time of less than 10 minutes.

In some embodiments, the method also include applying the initiator to the fabric or mat so that the MMA resin is combined with the initiator upon application of the MMA resin to the fabric or mat. In other embodiments, combining the MMA resin with the initiator includes mixing the MMA resin and the initiator prior to applying the MMA resin to the fabric or mat. The fabric or mat may include sized fibers having a functional group that covalently bonds with the MMA resin. The MMA resin may be or include a mixture of an MMA monomer and a PMMA polymer. The method may further include winding the fully impregnated thermoplastic prepreg into a roll product. The MMA resin may be applied to the fabric or mat via a die that is positioned within a hood or enclosure that covers and encloses at least a portion of the fabric or mat.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A system for manufacturing a fully impregnated polymethyl methacrylate prepreg in a continuous process, the system comprising:
    a mechanism for moving a fabric or mat from a starting point to an ending point, the fabric or mat being subjected to a plurality of processes between the starting point and the ending point and the fabric or mat being in substantially constant movement between the starting point and ending point;
    a resin application mechanism that is configured to apply a methyl methacrylate (MMA) resin to the fabric or mat as the fabric or mat is moved past the resin application mechanism, the MMA resin being in contact with an initiator upon application of the MMA resin to the fabric or mat, the initiator facilitating in polymerizing the MMA resin to form polymethyl methacrylate (PMMA);
    a press mechanism that is configured to press the MMA resin through the fabric or mat as the fabric or mat is moved past or through the press mechanism such that the MMA resin fully saturates the fabric or mat during polymerization of the MMA resin; and
    a curing oven having a temperature of between 40 degrees Celsius and 100 degrees Celsius, the curing oven being configured to effect polymerization of the MMA resin to form PMMA as the fabric or mat is moved through the curing oven such that the fabric or mat is fully impregnated with PMMA upon exiting the curing oven;
    wherein the system is configured to maintain the MMA resin at a temperature of between 40° C. and 80° C. prior to the application of the MMA resin to the fabric or mat; and
    wherein the resin application mechanism is positioned above a lower belt of the press mechanism so that the MMA is applied to the fabric or mat as the fabric or mat is passed under the resin application mechanism and atop the lower belt.

2. The system of claim 1, wherein the system further comprises a mixing mechanism that is configured to mix the MMA resin with the initiator prior to application of the MMA resin to the fabric or mat.

3. The system of claim 2, wherein the system further comprises a first holding tank and a second holding tank that is separate from the first holding tank, wherein the first holding tank comprises the MMA resin and the second holding tank comprises the initiator.

4. The system of claim 1, wherein the initiator is an organic peroxide.

5. The system of claim 1, wherein the system further comprises a single holding tank that comprises a mixture of the MMA resin and the initiator.

6. The system of claim 1, wherein the resin application mechanism comprises a die that applies the MMA resin to the fabric or mat.

7. The system of claim 6, wherein the system further comprises a hood or enclosure that covers and encloses at least a portion of the fabric or mat, wherein the die is positioned within the hood or enclosure such that the MMA resin is applied to the fabric or mat within the hood or enclosure and MMA resin vapors are contained within the hood or enclosure.

8. The system of claim 7, wherein the system further comprises an exhaust mechanism that is configured to remove or ventilate the MMA resin vapors and/or other gases within the hood or enclosure.

9. The system of claim 1, wherein the system further comprises a winding mechanism that is configured to wind the fully impregnated fabric or mat into a roll product after the fully impregnated fabric or mat exits the curing oven.

10. The system of claim 1, wherein the press mechanism is a double belt compression press that sandwiches the fabric or mat between the lower belt and an upper belt.

11. A system for manufacturing a polymethyl methacrylate prepreg, wherein the system comprises:
   a mechanism for continuously moving a fabric or mat;
   a resin application component that applies a methyl methacrylate (MMA) resin to the fabric or mat as the fabric or mat is continuously moved past the resin application component;
   a press mechanism that presses the fabric or mat during the continuous movement of the fabric or mat and subsequent to application of the MMA resin to ensure that the MMA resin fully saturates the fabric or mat; and
   a curing oven through which the fabric or mat is continuously moved, the curing oven being maintained at a temperature of between 40° C. and 100° C. to polymerize the MMA resin and thereby form a thermoplastic polymethyl methacrylate (PMMA) polymer so that upon exiting the curing oven, the fabric or mat is fully impregnated with the thermoplastic PMMA polymer;
   wherein the resin application is positioned above a lower belt of the press mechanism so that the MMA resin is applied to the fabric or mat as the fabric or mat is passed under the resin application component and atop the lower belt.

12. The system of claim 11, wherein the system further comprises a mixing mechanism that mixes the MMA resin with an initiator prior to application of the MMA resin to the fabric or mat.

13. The system of claim 12, wherein the system further comprises a first holding tank and a second holding tank that is separate from the first holding tank, the first holding tank being configured to deliver the MMA resin to the mixing mechanism and the second holding tank being configured to deliver the initiator to the mixing mechanism.

14. The system of claim 11, wherein the system further comprises a hood or enclosure that covers and encloses at least a portion of the fabric or mat, the resin application component being positioned within the hood or enclosure such that the MMA resin is applied to the fabric or mat within the hood or enclosure.

15. The system of claim 14, wherein the system further comprises an exhaust component that is fluidly coupled with the hood or component to remove vapors within the hood or enclosure.

16. The system of claim 11, wherein the press mechanism is a double belt compression press that sandwiches the fabric or mat between the lower belt and an upper belt.

17. The system of claim 1, wherein the fabric or mat includes chopped fibers.

18. The system of claim 11, wherein the fabric or mat includes chopped fibers.

* * * * *